June 20, 1939.  H. H. HOLMES  2,163,557

MANUFACTURE OF CIRCULAR KNITTED ARTICLES WITH POUCHES

Filed April 8, 1937  6 Sheets-Sheet 1

Inventor,
Henry Harold Holmes,
by Frank S. Appleman
Attorney.

Inventor,
Henry Harold Holmes,

June 20, 1939.  H. H. HOLMES  2,163,557

MANUFACTURE OF CIRCULAR KNITTED ARTICLES WITH POUCHES

Filed April 8, 1937  6 Sheets—Sheet 6

Inventor,
Henry Harold Holmes,
by Frank S. Appleman
attorney.

Patented June 20, 1939

2,163,557

UNITED STATES PATENT OFFICE 2,163,557

MANUFACTURE OF CIRCULAR KNITTED ARTICLES WITH POUCHES

Henry Harold Holmes, Leicester, England, assignor to Wildt and Company Limited, Leicester, England, a British company Application April 8, 1937, Serial No. 135,779
In Great Britain April 17, 1936

9 Claims. (Cl. 66—1)

This invention relates to the manufacture of circular knitted articles with pouches, and has reference more particularly to the production of articles such as hose, half-hose, three-quarter hose and socks in strings i. e. continuously with one article joined to the next, on circular seamless hosiery knitting machines, such articles being formed with heel and toe pouches. As will be understood the toe pouch of each article is adjacent to the top of the next and usually a few waste courses are knitted between these portions to provide for the separation of one from the other.

The invention is primarily concerned with the production of hose, half-hose, three-quarter hose and socks having rib tops, in the knitting of which difficulty is often experienced in producing clear rib knitting following the formation of a toe pouch. It is found that owing to the unequal effect of the take-down means on the work due to the presence of the toe pouch loop accumulation or tucking is apt to occur in the knitting of the initial courses of the next article on the same side of the work as the toe pouch so that the appearance of the fabric forming the top of the next article is impaired.

The object of the present invention is to obviate the aforesaid disadvantage and this is achieved by a variation in the knitting of the fabric immediately adjacent to a pouch located at or near one end of a length of fabric such as a hose, half-hose, three-quarter hose or like article, i. e. between such a pouch and the next article in the case of articles produced in string formation.

According to this invention a portion of the said fabric is varied in length walewise on one side of the work as compared with that on the opposite side in order to compensate for the pressure of the pouch.

In the accompanying drawings.

Like parts are designated by similar reference characters throughout the drawings.

Figure 1:
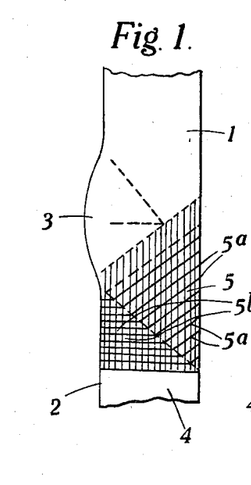
Figure 1 is a diagrammatic representation of adjacent portions of two such circular knitted articles produced in accordance with the invention.
Figure 2:
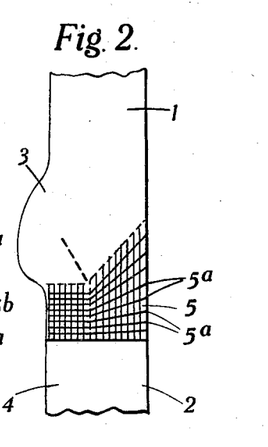
Figure 2 is a similar view illustrating a modification.

In each of Figures 1 and 2, 1 represents the lower end and 2 the adjacent upper end of two adjoining circular knitted articles, i. e. hose, half-hose, three-quarter hose or socks, produced in string formation. At 3 is shown the toe pouch of one article, 4 represents the rib top of the next article and 5 indicates the fabric immediately adjacent the toe pouch, that is to say, the fabric between said pouch and the rib top. In the specific examples shown a variation in the length of the fabric 5, for the purpose herein before alluded to, is effected by a variation in the length of the knitted loops or by a variation of the character of the knitting mainly on the opposite side of the work to the toe pouch 3. Preferably the desired result is achieved by forming partial courses of slackened loops 5a in the region indicated by the series of inclined lines. The normal loops on the other side of the work are indicated at 5b. Alternatively the said fabric in this region may be varied by means of tucking, non-knitting or floating. The walewise variation in the length of the fabric 5 is preferably graduated from course to course as shown in Figure 1 or it may be uniform as shown in Figure 2. The commencement of the variation shown in Figure 1 extends practically around the entire article and tapers gradually to a point.

Figure 3:
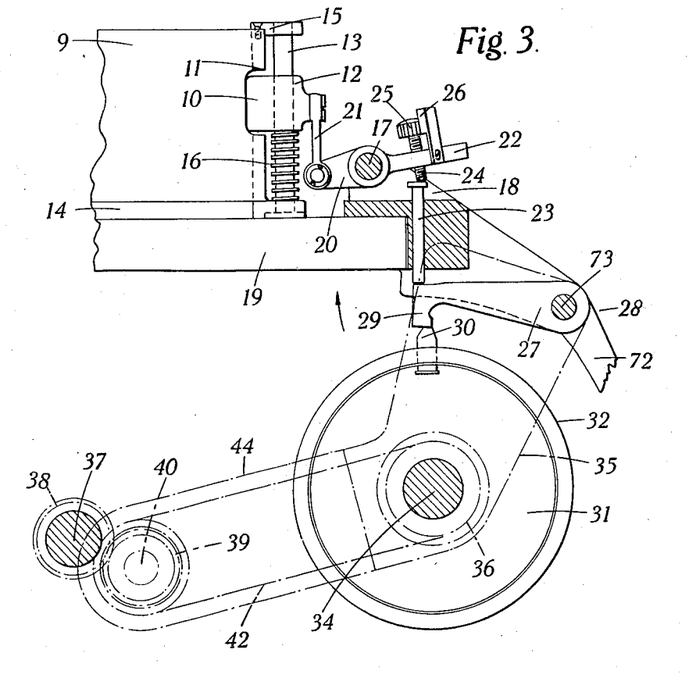
Figure 3 is a view drawn more or less diagrammatically of so much of a machine of the superposed rotary needle cylinder type as is necessary to illustrate the application thereto of the mechanism provided by the present invention.
Figure 4:
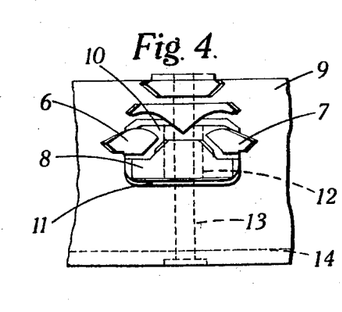
Figures 4 and 5 are detail elevational and plan views respectively of the stitch cam assemblage of the machine.
Figure 5:
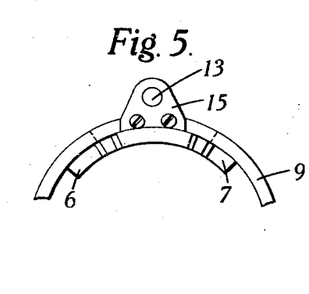

Mechanism suitable for producing a portion of fabric such as that indicated at 5 in Figure 1 or 2 will now be described broadly with reference to Figures 3–5. The stitch cams 6 and 7 and the centre guard cam 8 in the bottom cam box 9 of the machine are rigidly secured to a carrier block 10 which is mounted for limited movement in a vertical direction within a rectangular opening 11 formed in the side of the said cam box. This carrier block is formed or provided with a lug or similar part such as 12 which projects outwardly through the opening 11 and is suitably bored to enable it to slide on a vertically disposed rod 13 mounted between the flange 14 of the bottom cam box and a small outwardly projecting plate 15 secured to the top of the box. The stitch cam assemblage (i. e. the block 10 and the cams it carries) is normally held in a raised position by means of a compression spring 16 which surrounds the rod 13 and is interposed between the flange 14 and the underside of the lug 12. Thus if the carrier block 10 is pulled down against the action of the spring 16, as by the means now to be described, the stitch cams 6 and 7 and the centre guard cam 8 are correspondingly lowered. The size of the opening 11 is such as to enable the stitch cam assemblage to be moved downwards to a greater extent than usual. Pivotally mounted at 17 on a part 18 of, on or associated with the machine frame above the bed plate 19 is a two-armed lever, one arm 20 of which is connected by means of a link 21 to the lug 12 while the other arm 22 is adapted to make contact—either directly or indirectly—with the upper end of a pin 23 freely slidable in the part 18. The arm 22 carries a screw 24, the lower end of which makes contact with the pin 23 and by suitably turning the screw adjustments can be made to vary the extent to which the block 10 can be moved in a downward direction. The screw 24 is furnished with a toothed head 25 with which is engaged a catch spring 26 suitably mounted on the arm 22. This spring normally prevents rotation of the screw but is sufficiently resilient to permit of adjustment of the latter. At its lower end the pin 23 rests on one arm 27 of what is in effect another two-armed lever 28, the arrangement being such that when said lever is rocked in the direction of the arrow in Figure 3, the pin 23 and the arm 22 are lifted while the arm 20 is lowered to pull down the link 21 and consequently lower the stitch cam assemblage. If now the lever 28 is allowed to resume its original position, the pin 23 will descend and permit the stitch cam assemblage to return to its normal position under the influence of the spring 16. The required movements of the cam assemblage to effect slackening of the fabric knitted on the instep needles and, if desired, also on some of the heel and toe needles of the machine (not shown) are therefore obtained by suitably oscillating the lever 28. For this purpose the free end of the arm 27 is formed with an angular extension 29 adapted to extend into the path of a stud 30 which is slidably mounted in and extends radially from the main control drum 31 of the machine. This stud 30 is adapted to be acted on by mechanism hereinafter to be described for moving it into and out of from the drum under suitable control while at the same time the drum is being racked round step by step in timed relation with the rotation of the needle cylinders in the usual way. Thus whenever the machine is in operation the mechanism for acting on the stud 30 is working. Consequently the stud is moving in and out for at least a part of each revolution of the drum 31 but it only becomes effective for its intended purpose when the drum has advanced to the position indicated in Figure 3 in which position the said pin is disposed beneath the angular extension 29 aforesaid and the drum is caused to pause during the knitting of a few courses. This number of courses will depend on the length of fabric which is to be knitted between the pouch at one end of an article and the top of the next article. For the purpose of causing the drum to pause the operating mechanism thereof (not shown) may be bluffed or otherwise rendered temporarily inoperative in any suitable manner. The timing of the stud 30 into and out of operation is determined according as to whether the stitch cam assemblage is to be moved downwards for different lengths of time in different courses of knitting in order to effect a graduated slackening of the fabric knitted immediately adjacent to a pouch, as shown in Figure 1, or is to be moved downwards for the same length of time in each course so as to produce a uniform variation in the length of the said fabric as shown in Figure 2. Mechanism for effecting the appropriate movements of the stud 30 for producing a portion of slackened fabric such as that indicated at 5 in Figure 1 will now be described with reference to Figures 6–13.

Figure 6:
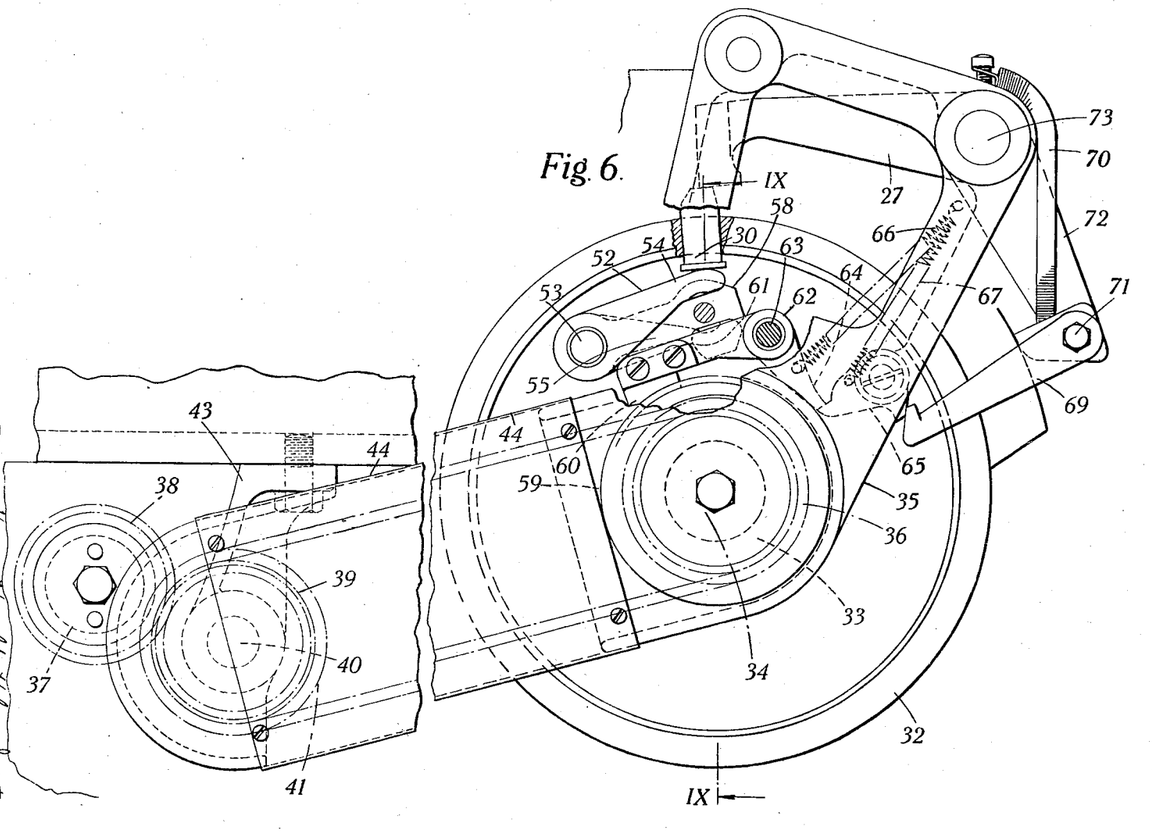
Figure 6 is an elevational view showing the means which are employed to operate the mechanism illustrated in Figure 3.
Figure 7:
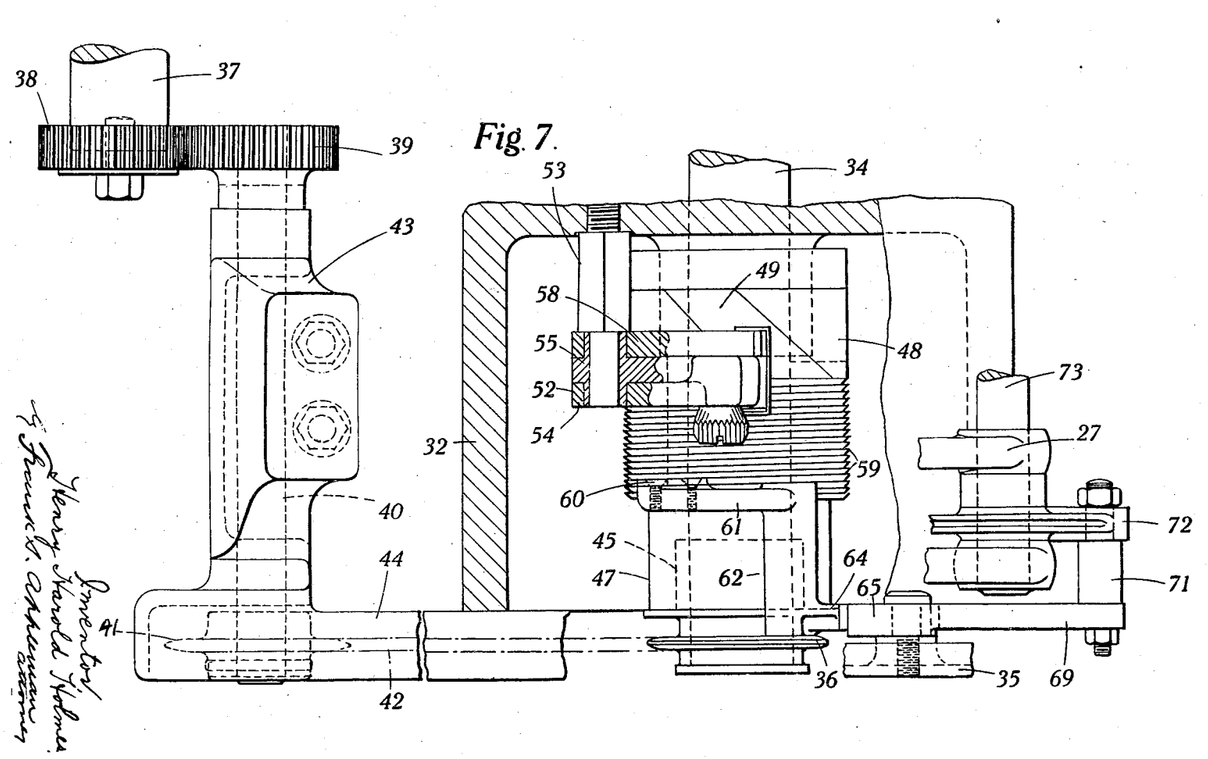
Figure 7 is a plan view of the same—partly in section.
Figure 8:
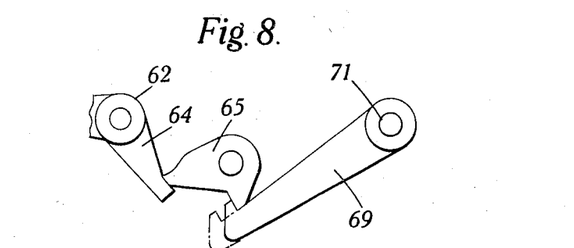
Figure 8 is a detail view hereinafter to be described.
Figure 9:
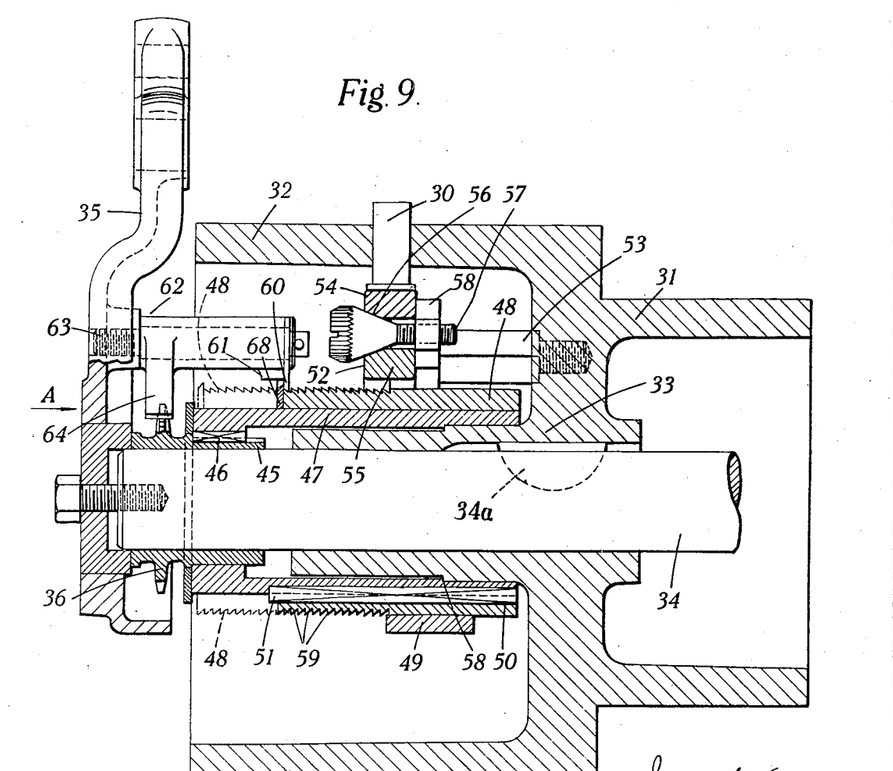
Figure 9 is a transverse sectional view taken on the line IX—IX of Figure 6.
Figure 10:
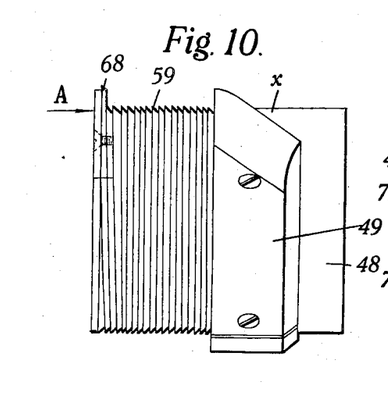
Figure 10 is a side elevational view of a rotary cam unit included in the mechanism.

The main control drum 31 is formed at one end with an extension 32 of cylindrical form into which projects a hub 33 bored for the reception of the drum shaft 34 to which it is fixed by a key such as 34a. This shaft extends through and projects slightly beyond the open end of the extension 32 where it is journalled in any suitable fixed part such as 35, formed or provided on the machine frame. In Figure 6 a portion of the fixed part 35 is broken away to show the mechanism more clearly. Mounted loosely on the end of the shaft 34 is a sprocket wheel 36 which is adapted to be driven from the main shaft 37 of the machine. For this purpose the said main shaft has rigidly secured thereto a gear wheel 38 which meshes with a similar wheel 39 on one end of a spindle 40 and consequently drives the latter. At its other end the spindle 40 carries a sprocket wheel 41 around which and the sprocket wheel 36 is passed a chain 42. Thus the wheel 36 is driven at the same speed as the needle cylinders of the machine. The spindle 40 is mounted to rotate in bearings formed in a bracket 43 adapted to be attached to any suitable fixed part of the machine, and the chain 42 may be and preferably is enclosed within a casing 44. The sprocket wheel 36 is formed or provided with a hub 45 to which is keyed at 46 a cylindrical member 47 adapted to revolve about the hub 33 aforesaid (see Figures 9 and 11). A rotary cam unit comprising a small drum 48 having attached thereto cam segments or sections 49 is arranged for rotation with the cylindrical member 47 but is adapted for sliding movement on the latter in an axial direction. For this purpose the drum 48 may, as shown, be suitably grooved as at 50 for reception of a spline 51 fitted in the member 47. The arrangement just described is therefore such that during the operation of the machine the parts 45, 47 and 48 rotate together about the drum shaft 34. The cam segments or sections 49 are formed and arranged on the drum 48 in such a way as to provide a shaped gap $x$ (see Figure 12) for causing the stud 30 to move outwards for different lengths of time in different courses of knitting. For this purpose a small lever 52 mounted so as to be capable of turning on a pivot stud 53 is adapted to make contact with the rotary cam unit and to act on the lower end of the stud. To enable it to be adjusted this lever is made in two parts 54 and 55 which are disposed side by side and at their free ends are adapted to receive between them the conical head 56 of an adjusting screw 57. The part 54 acts on the stud 30 while the part 55 engages the rotary cam unit. The screw 57 is carried by, i. e. is screwed into, a small carrier plate 58 fixed on the stud 53 and extends transversely between the parts 54 and 55. Thus by suitable adjustment of the said screw the consequent movement of the conical head 56 either forces the two parts 54 and 55 away from each other or allows them to move together. Otherwise stated the width of the free end of the lever 52 can be varied as required by means of the screw 57 to effect a corresponding variation in the length of the stroke of the stud 30. The pivot pin 53 is screwed in a suitable part of the main control drum 31. When the drum 31 is caused to pause as aforesaid the stud 30 can drop to its lowermost position to return the stitch cam assemblage to its normal position whenever, during each revolution of the small drum 48, the lever 52 drops into the gap $x$. When, however, the said lever is raised by riding up onto the cam segments or sections 49, the stud is moved out and the stitch cam assemblage is lowered. Consequently if, as well as being caused to rotate, the drum 48 is moved axially from the position indicated in dotted lines in Figure 9 to the full line position in that figure, different portions of the gap $x$ will be brought into action to produce a slackened area of corresponding shape. A similar effect could, of course, be produced by moving the lever 52 axially of the drum 48 while the latter is held relatively stationary although it is preferred to move the drum. In the constructional form of mechanism now being described, the rotary cam unit is advanced gradually from the dotted position to the full line position in Figure 9, and allowed to return to its original position continuously throughout the operation of the machine. Thus so long as the machine is in operation the lever 52 is being acted upon. During such axial movements of the drum 48 the cylindrical member is, of course, prevented from similar movement as, for example, by a shouldered part 58 on the hub 33.

Figure 11:
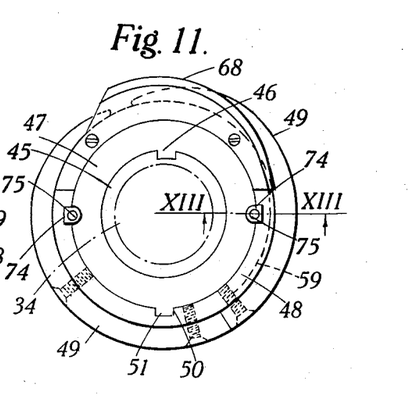
Figure 11 is an end view of the same and adjacent parts as viewed in the direction of the arrow A in Figure 10.
Figure 12:
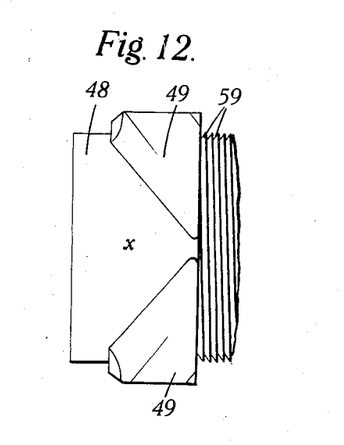
Figure 12 is a detail view of one end of the cam unit.
Figure 13:
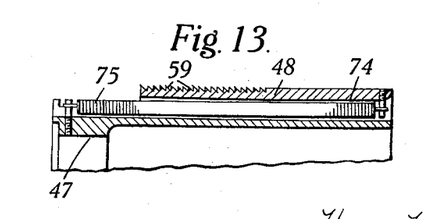
Figure 13 is a detail sectional view taken on the line XIII—XIII of Figure 11.

For the purpose of enabling the drum 48 to be moved axially it is formed with a buttress thread 59 and there is provided for engagement with this thread a knife edge member 60. This member is attached to one arm 61 of a two-armed lever 62 which latter is pivotally mounted on a stud 63 extending from the part 35. The other arm 64 of said lever is adapted for engagement with a catch member 65 and the lever is controlled by a tension spring 66 (see Figure 6) which is connected at one end to the arm 64 and at the other end to the part 35. The spring 66 normally acts to maintain the knife edge member 60 in engagement with the threads 59. The two arms of the lever 62 are spaced apart by a boss and the lever is prevented from axial movement in any suitable manner. The catch member 65 is pivotally mounted and controlled by a tension spring 67. Assuming the drum 48 to be in the dotted position aforesaid, then, by reason of the rotation of the said drum and the engagement of the member 60 with the threads 59, the drum will advance until it reaches the full line position at which time it is necessary to disengage the member 60 before the drum can return or be caused to return to its original position. For effecting this disengagement a plate 68 providing an outwardly projecting cam-like surface is attached to the end of the drum. This plate is shaped to form an extension of the last thread on the drum and acts at the appropriate time to lift the knife edge member clear of the threads. Whenever the member 60 is lifted in this manner the arm 64 is slightly lowered against the action of the spring 66 and the catch member 65 moves to the position shown in Figure 8 to hold the arm 61 raised. At the same time a detent 69, which is controlled by a spring 70 and pivotally mounted on a stud 71 engages behind a shouldered portion of the member 65 to lock the latter in position. The stud 71 extends from the lower end of the arm 72 of the lever 28 and the latter is mounted for pivotal movement on a fixed spindle 73. Thus the means just described operate to hold the member 60 clear of the drum 48 and consequently to allow the latter to move or be moved to its original position prior to being advanced again. Preferably spring means are employed to return the drum. As shown in Figures 11 and 13, the cylindrical member 47 and the drum 48 are hollowed out to provide axially extending passages 74 for the accommodation of tension springs 75 each of which is connected at one end to the member 47 and at the other end to the drum. When, after having been advanced, the drum is allowed to spring back the whole mechanism is once more re-set in its initial position. Detent 69 is caused to operate at the appropriate time, for example by cam means associated with the main control drum, to effect a return of the catch member 65 to its original position and thus permit the knife edge member 60 to re-engage the threads 59.

When slack knitted fabric is being knitted on the instep needles the fabric made on the heel and toe needles may be knitted as tightly as possible. It is to be understood that in the foregoing arrangement the stitch cam or cam assemblage is only lowered in a portion of every course of knitting but that the length of time for which the said cam or assemblage is lowered is increased, course by course, until finally if desired it is lowered for substantially one half of a course or even longer, acording to the particular shape of the cam segments employed. The particular cam segments or sections shown in the drawings are such that finally the stitch cam assemblage is lowered for considerably more than one half of a course, in which case some of the heel and toe needles as well as the instep needles are caused to draw longer loops.

When slack knitted stitches are being produced the action of the sinkers which co-operate with the needles in stitch formation may be modified such as by moving them upwards or/and imparting increased inward movement thereto for the purpose of compensating for the longer loop drawing action of the needles.

The invention is not to be regarded as limited to practise on machines of the particular characteristic type hereinbefore referred to as other circular knitting machines capable of producing such articles may be used and such machines may be either of the rotary needle cylinder type or of the stationary needle cylinder type.

An important feature of the invention consists in making articles such as seamless hosiery in string formation wherein there is a pouch, for example a toe pouch, at one end of each article and providing between the said pouch and the adjacent end, for example the rib top of the next article, a few courses of fabric in which there is a variation in the knitting of the fabric on one side of the work as compared with that on the opposite side of the work, and the invention is therefore not to be regarded as limited to the provision of any particular mechanical means such, for example, as those hereinbefore described, for achieving this result.

It is found in practice that variation in the knitting in the manner herein described obviates the production of tucking and like abnormal effects in courses, particularly rib courses immediately following the waste courses in which the variation is effected, and gives clear knitting, and this is believed to be due to the fact that the work is tensioned equally all round by the takedown means as the result of such variation.

What I claim then is:

1. A method of producing circular knitted articles with pouches on a circular seamless hosiery knitting machine having a group of instep needles and a group of heel and toe needles, which includes as a characteristic step, operating the instep needles so that longer stitches are knitted for any desired number of courses, in order to produce longer stitches in the fabric on the opposite side of the work to a pouch immediately after formatnon of said pouch, for the purpose herein described.

2. A method of producing circular knitted articles with pouches, on a circular seamless hosiery knitting machine having a group of instep needles, a group of heel and toe needles and a stitch cam assemblage for action on the needles, said assemblage being adapted to be moved downwards, which includes as a characteristic step moving the said stitch cam assemblage downwards to a greater extent than usual for a predetermined portion of each of a predetermined number of courses of knitting following the formation of a pouch in order to effect a slackening of the fabric knitted on appropriate needles, immediately adjacent to and mainly on the opposite side of said pouch, for the purpose herein described.

3. A method of producing circular knitted articles with pouches, on a circular seamless hosiery knitting machine having a group of instep needles, a group of heel and toe needles and a stitch cam assemblage for action on the needles, said assemblage being adapted to be moved downwards, which includes as a characteristics step moving the said stitch cam assemblage downwards to a greater extent than usual and for different portions of different courses of knitting following the formation of a pouch in order to effect a graduated slackening of the fabric knitted on appropriate needles, immediately adjacent to and mainly on the opposite side of said pouch, for the purpose herein described.

4. A method according to claim 3, in which the length of time for which the stitch cam assemblage is moved downwards is increased course by course until finally it is lowered for over one half of a course, at which time the fabric knitted on the instep needles and also some of the heel and toe needles is slackened.

5. In combination in a circular seamless hosiery knitting machine having a group of instep needles, a group of heel and toe needles and a stitch cam assemblage for action on the needles, said assemblage being adapted to be moved downwards, a lever for effecting a downward movement of said stitch cam assemblage to a greater extent than usual, and means for operating said lever, said means being adapted to cause the lever to act for a predetermined portion of each of a predetermined number of courses of knitting following the formation of a pouch whereby a slackening of the fabric knitted on appropriate needles immediately adjacent to and mainly on the opposite side of said pouch can be effected, for the purpose herein described.

6. In combination in a circular seamless hosiery knitting machine having a group of instep needles, a group of heel and toe needles and a stitch cam assemblage for action on the needles, said assemblage being adapted to be moved downwards, a lever for effecting a downward movement of said stitch cam assemblage to a greater extent than usual, and means for operating said lever, said means being adapted to cause the lever to act for different portions of the length of predetermined courses of knitting following the formation of a pouch whereby a graduated slackening of the fabric knitted on appropriate needles immediately adjacent to and mainly on the opposite side of said pouch can be effected, for the purpose herein described.

7. In combination in a circular seamless hosiery knitting machine having a group of instep needles, a group of heel and toe needles and a stitch cam assemblage for action on the needles, said assemblage being adapted to be moved downwards, a lever for effecting a downward movement of said stitch cam assemblage to a greater extent than usual, a cam drum for operating said lever and having in its circumference a gap for causing the lever to act for a predetermined portion of each of a predetermined number of courses of knitting following the formation of a pouch, and means for rotating said cam drum whereby a slackening of the fabric knitted on appropriate needles immediately adjacent to and mainly on the opposite side of said pouch can be effected, for the purpose herein described.

8. In combination in a circular seamless hosiery knitting machine having a group of instep needles, a group of heel and toe needles and a stitch cam assemblage for action on the needles, said assemblage being adapted to be moved downwards, a lever for effecting a downward movement of said stitch cam assemblage to a greater extent than usual, a cam drum for operating said lever and having in its circumference a shaped gap for causing the lever to act for different portions of the length of predetermined courses of knitting following the formation of a pouch, means for rotating the drum at the same speed as the machine, and means operated in timed relation with the rotary motion of the machine for effecting relative movement between the lever and the drum in an axial direction to bring different portions of the gap into action, whereby a graduated slackening of the fabric knitted on appropriate needles immediately adjacent to and mainly on the opposite side of said pouch can be effected, for the purpose herein described.

9. In combination in a circular seamless hosiery knitting machine having a group of instep needles, a group of heel and toe needles and a stitch cam assemblage for action on the needles, said assemblage being adapted to be moved downwards, a lever for effecting a downward movement of said stitch cam assemblage to a greater extent than usual, a cam drum for operating the lever, said drum being formed with threads and having at its circumference a shaped gap for causing the lever to act for different portions of the length of predetermined courses of knitting following the formation of a pouch, means for rotating the drum at the same speed as the machine, a member for engagement with said threads and adapted by such engagement to effect movement of said drum in an axial direction to bring different portions of the gap into action, means operated in timed relation with the rotary motion of the machine for effecting engagement of the said member with and disengagement it from the threads, and means for returning the drum to a normal position after having been moved axially, whereby a graduated slackening of the fabric knitted on the instep and some of the heel and toe needles immediately adjacent to and mainly on the opposite side of said pouch can be effected, for the purpose herein described.

HENRY HAROLD HOLMES.